S. T. FERGUSON.

Colter.

No. 8,038. Reissued Jan. 15, 1878.

WITNESSES:

C. Clarence Poole

Geo. H. Evans

INVENTOR:

Sam T. Ferguson per attys. A. H. Evans & Co

N. PETERS, PHOTO-LITHOGRAPHER, WASHINGTON, D. C.

UNITED STATES PATENT OFFICE.

SAM T. FERGUSON, OF MINNEAPOLIS, MINNESOTA.

IMPROVEMENT IN COLTERS.

Specification forming part of Letters Patent No. 172,872, dated February 1, 1876; Reissue No. 8,038, dated January 15, 1878; application filed December 29, 1877.

*To all whom it may concern:*

Be it known that I, SAM T. FERGUSON, of Minneapolis, Minnesota, have invented certain new and useful Improvements in Caster-Colter for Plows, of which the following is a full, clear, and exact description, reference being had to the accompanying drawings, making a part of this specification, in which—

Figure 1:
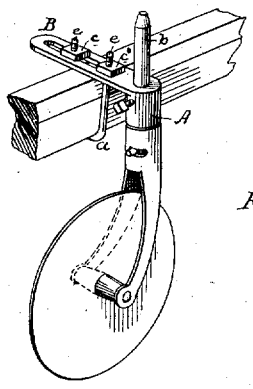
Figure 2:
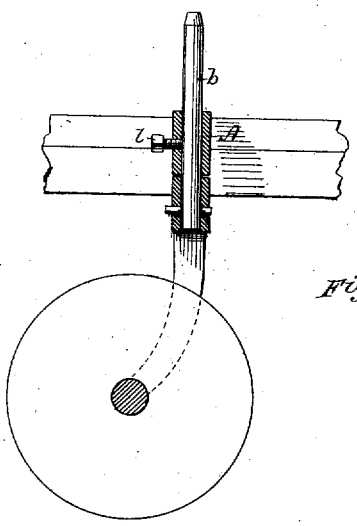

Figure 1 is a perspective view of a caster-colter with my improvement attached. Fig. 2 is a section of the same.

The object of my invention is to provide a cheap, simple, and easily-adjusted caster-colter for plows, and one which, while having a lateral and vertical adjustment, can also be adjusted at any point on the beam desirable; and it consists in the combination and arrangement of parts hereinafter described and claimed.

To enable others skilled in the art to make and use my invention, I will proceed to describe the exact manner in which I have carried it out.

In the said drawings, A represents a sleeve fitting on the spindle, and which can be adjusted vertically to any desired position on the spindle *b* by means of the thumb-screw *l*. Attached to the sleeve A is a slotted projecting arm, B. Passing around the beam C is the yoke *a*, whose ends pass through the slot in the arm B, and are provided with screws *e* and nuts *e e'*, by which means the arm B may be secured to the beam C at any desired point, and thus adjust the distance between the colter and the plow-point. By means of the slot in arm B a lateral adjustment is given to the colter in reference to the beam.

This colter-caster can be attached to either iron, steel, or wood beams without boring or otherwise injuring the beams in any manner, and can be readily transferred from one plow to another.

It is evident that the projecting arm B may be placed below the beam, and the yoke *a* be placed over the beam, without departing from the spirit of my invention.

Having thus explained my invention, what I claim as new, and desire to secure by Letters Patent, is—

In a caster-colter, the sleeve A, provided with the thumb-screw *l*, and having the slotted horizontal arm B, in combination with the yoke *a*, provided with the screws and nuts *e e'*, substantially as and for the purpose set forth.

In testimony that I claim the foregoing I have hereunto set my hand.

SAM T. FERGUSON.

Witnesses:
A. McHENCH,
A. H. EVANS.